(12) United States Patent
Wu

(10) Patent No.: US 12,726,434 B2
(45) Date of Patent: Sep. 1, 2026

(54) PACKET FORWARDING METHODS AND APPARATUSES

(71) Applicant: New H3C Technologies Co., Ltd., Hangzhou (CN)

(72) Inventor: Tingqiao Wu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 116 days.

(21) Appl. No.: 19/004,157

(22) Filed: Dec. 27, 2024

(65) Prior Publication Data

US 2026/0156070 A1 Jun. 4, 2026

(30) Foreign Application Priority Data

Dec. 3, 2024 (CN) ......................... 202411768870.3

(51) Int. Cl.
*H04L 45/00* (2022.01)
*H04L 45/74* (2022.01)
*H04L 69/22* (2022.01)

(52) U.S. Cl.
CPC .............. *H04L 45/34* (2013.01); *H04L 45/74* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 12,537,761 | B2 * | 1/2026 | Zhang | H04L 45/12 |
| 2018/0359176 | A1 * | 12/2018 | Nainar | H04L 45/22 |
| 2022/0182326 | A1 * | 6/2022 | Gamage | H04L 45/26 |
| 2024/0106740 | A1 | 3/2024 | Chang et al. | |

(Continued)

FOREIGN PATENT DOCUMENTS

| | | | |
|---|---|---|---|
| CN | 113206790 | A | 8/2021 |
| CN | 113497800 | A | 10/2021 |
| CN | 117997625 | A | 5/2024 |

(Continued)

OTHER PUBLICATIONS

Mianzu, "SRv6—Message Forwarding Process", CSDN blog, https://blog.csdn.net/qq_33681684/article/details/127182706, Oct. 22, 2022.

(Continued)

*Primary Examiner* — Chris Parry
*Assistant Examiner* — Abderrahmen Chouat
(74) *Attorney, Agent, or Firm* — BROADVIEW IP LAW, PC

(57) ABSTRACT

This application provides a packet forwarding method and apparatus. In the embodiment, a headend releases respectively to other nodes on the current path SRv6 TE Policy source path routing and a source path control probe packet, to trigger other nodes on the current path to generate a source path control table. The source path control table contains routing forwarding information that nodes on the path of the existing SRv6 TE Policy conventionally does not care about, in order to use this source path control table to mitigate risks caused by nodes on the path of the existing SRv6 TE Policy not caring about the above routing forwarding information and improve the security of the SRv6 network.

15 Claims, 10 Drawing Sheets

(56) References Cited

U.S. PATENT DOCUMENTS

2025/0175416 A1* 5/2025 Valceanu ................ H04L 45/34
2025/0254120 A1* 8/2025 Hu .......................... H04L 45/20

FOREIGN PATENT DOCUMENTS

WO 2022/199486 A1 9/2022
WO 2023/179174 A1 9/2023
WO 2023/179656 A1 9/2023

OTHER PUBLICATIONS

Cisco, "Configure Design and Migration Best Practices for Segment Routing over IPv6", https://www.cisco.com/c/en/us/support/docs/ip/ipv6-routing/220485-configure-design-and-migration-best-prac.html, Jun. 1, 2023.

Extended European Search Report for EP 24223566.1 by European Patent Office dated May 22, 2025.

Li, Xueting et al., "Segment Routing Policy-Based Source Address Validation (SAV) Mechanism draft-li-savnet-srsav-00", Internet Draft submitted to Internet Engineering Task Force, XP15169708A, Sep. 2024.

Yang, Feng et al., "SID as source address in SRv6 draft-yang-spring-sid-as-source-address-03", Internet Draft submitted to Internet Engineering Task Force, XP015164445, Jan. 2024.

* cited by examiner

101

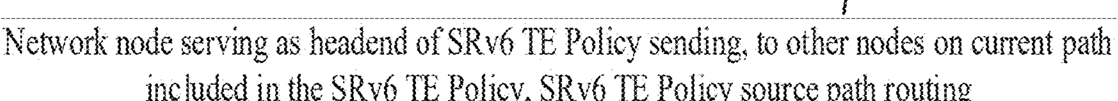

102

Network node serving as headend of SRv6 TE Policy sending, to other nodes on current path, a source path control probe packet for probing the current path; the source path control probe packet carrying second routing information for forwarding packets on the current path, so that any node other than the headend on the current path, when recognizing that the second routing information carried by the source path control probe packet matches with recorded first routing information, generates a source path control table that matches with the first routing information; any node other than headend on current path configured to perform forwarding control on a received service packet based on the generated source path control table

FIG. 1

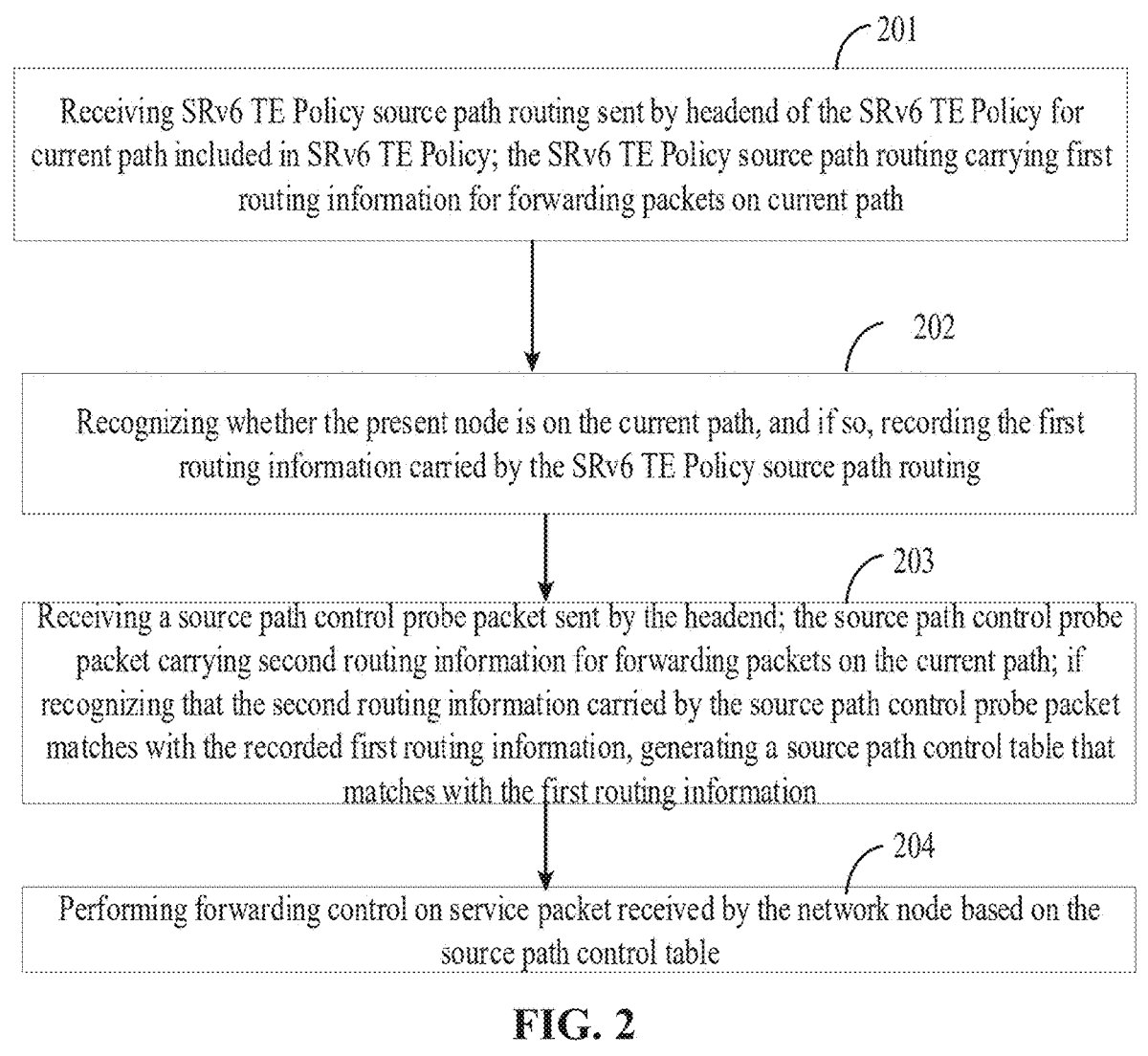

201 Receiving SRv6 TE Policy source path routing sent by headend of the SRv6 TE Policy for current path included in SRv6 TE Policy; the SRv6 TE Policy source path routing carrying first routing information for forwarding packets on current path 202 Recognizing whether the present node is on the current path, and if so, recording the first routing information carried by the SRv6 TE Policy source path routing 203 Receiving a source path control probe packet sent by the headend; the source path control probe packet carrying second routing information for forwarding packets on the current path; if recognizing that the second routing information carried by the source path control probe packet matches with the recorded first routing information, generating a source path control table that matches with the first routing information 204 Performing forwarding control on service packet received by the network node based on the source path control table

FIG. 2

PACKET FORWARDING METHODS AND APPARATUSES

CROSS-REFERENCE TO RELATED APPLICATIONS

This patent application claims the priority of a Chinese patent application No. 202411768870.3, filed on Dec. 3, 2024, the entire content of which is hereby incorporated by reference for all purposes.

TECHNICAL FIELD

This application relates to the Internet of Things for network communications, particularly to packet forwarding methods and apparatuses.

BACKGROUND

In IPv6 Segment Routing (SRv6) networks, SRv6 Traffic Engineering Policy (TE Policy) provides a flexible method for selecting a forwarding path that accommodates diverse forwarding requirements of users. Utilizing SRv6 TE Policy wisely to select forwarding paths not only aids administrators in managing and planning the network, but also significantly eases the burden on network devices for forwarding.

However, in practical applications, the security of SRv6 networks often faces challenges. For example, for a service in an SRv6 network, on a transmission path included in the SRv6 TE Policy of this service, nodes other than a headend are only interested in the destination address of a received packet and the Segment List in the SRv6 packet header (SRH, Segment Routing Header) carried by the packet, in order to guide the forwarding of the packet based in the Segment List. The nodes other than the headend, as mentioned above, do not care about routing forwarding information such as the interface where the packet is received (referred to as the packet ingress interface), the source address carried by the packet, and whether the Segment List carried in the SRH header is correct, which poses a risk flaw. Once this risk flaw is exploited by a network intruder for attack, such as launching attacks on any of that node's interfaces after getting knowledge of a node's SID configuration, this can potentially allow malicious packets to infiltrate the SRv6 network and jeopardize the security thereof.

SUMMARY

Embodiments of the present application provide packet forwarding methods and apparatuses to improve security of SRv6 networks and effectively prevent attack packets from entering SRv6 networks.

An embodiment of the present application provides a packet forwarding method, the method applied to a network node, and the method including:

- sending, by the network node serving as a headend of an SRv6 Traffic Engineering Policy TE Policy to other nodes on a current path included in the SRv6 TE Policy, an SRv6 TE Policy source path routing; the SRv6 TE Policy source path routing carrying first routing information for forwarding packets on the current path, so that any node other than the headend on the current path, upon receiving the SRv6 TE Policy source path routing, records the first routing information carried by the SRv6 TE Policy source path routing;
- sending, by the network node serving as the headend to other nodes on the current path, a source path control probe packet for probing the current path; the source path control probe packet carrying second routing information for forwarding packets on the current path, so that any node other than the headend on the current path, when recognizing that the second routing information carried by the source path control probe packet matches with the recorded first routing information, generates a source path control table that matches with the first routing information; any node other than the headend on the current path being configured to perform forwarding control on a received service packet based on the generated source path control table.

An embodiment of the present application provides a packet forwarding method, applied to a network node, and the method including:

- if the network node serves as any node other than a headend of an SRv6 Traffic Engineering Policy TE Policy, then:
- receiving an SRv6 TE Policy source path routing sent by a headend of the SRv6 TE Policy for a current path included in the SRv6 TE Policy; the SRv6 TE Policy source path routing carrying first routing information for forwarding packets on the current path;
- recognizing whether the network node is on the current path, and if so, recording the first routing information carried by the SRv6 TE Policy source path routing;
- receiving a source path control probe packet sent by the headend; the source path control probe packet carrying second routing information for forwarding packets on the current path; if recognizing that the second routing information carried by the source path control probe packet matches with the recorded first routing information, generating a source path control table that matches with the first routing information;
- performing forwarding control on a service packet received by the network node based on the source path control table.

An embodiment of the present application provides a packet forwarding apparatus, the apparatus applied to a network node which serves as a headend of an SRv6 Traffic Engineering Policy TE Policy, and the apparatus including:

- a first sending unit configured to send to other nodes on the current path included in the SRv6 TE Policy an SRv6 TE Policy source path routing; the SRv6 TE Policy source path routing carrying the first routing information for forwarding packets on the current path, so that any node other than the headend on the current path, upon receiving the SRv6 TE Policy source path routing, records the first routing information carried by the SRv6 TE Policy source path routing;
- a second sending unit configured to send to other nodes on the current path a source path control probe packet for probing the current path; the source path control probe packet carrying second routing information for forwarding packets on the current path, so that any node other than the headend on the current path, when recognizing that the second routing information carried by the source path control probe packet matches with the recorded first routing information, generates a source path control table that matches with the first routing information; any node other than the headend on the current path being configured to perform forwarding control on a service packet based on the generated source path control table.

An embodiment of the present application provides a packet forwarding apparatus, the apparatus applied to a network node which serves as any node other than a headend of an SRv6 Traffic Engineering Policy TE Policy, and the apparatus including:

a receiving unit configured to receive an SRv6 TE Policy source path routing sent by a headend of the SRv6 TE Policy for a current path included in the SRv6 TE Policy; the SRv6 TE Policy source path routing carrying first routing information for forwarding packets on the current path;

a routing unit configured to recognize whether the network node is on the current path, and if so, record the first routing information carried by the SRv6 TE Policy source path routing;

the receiving unit further configured to receive a source path control probe packet sent by the headend; the source path control probe packet carrying second routing information for forwarding packets on the current path;

a processing unit configured to generate a source path control table that matches with the first routing information if recognizing that the second routing information carried by the source path control probe packet matches with the recorded first routing information;

a service control unit configured to perform forwarding control on a service packet received by the network node based on the source path control table.

An embodiment of the present application provides an electronic device. The electronic device includes: a processor and a machine-readable storage medium;

the machine-readable storage medium stores machine-executable instructions that can be executed by the processor;

the processor is configured to execute the machine-executable instructions to implement the steps of the methods disclosed above.

From the above technical solutions, it can be seen that the embodiments, a headend releases respectively to other nodes on the current path SRv6 TE Policy source path routing and a source path control probe packet, to trigger other nodes on the current path to generate a source path control table. The source path control table contains routing forwarding information that nodes on the path of the existing SRv6 TE Policy conventionally does not care about, in order to use this source path control table to mitigate risks caused by nodes on the path of the existing SRv6 TE Policy not caring about the above routing forwarding information and improve the security of the SRv6 network.

BRIEF DESCRIPTION OF DRAWINGS

The accompanying drawings, which are incorporated in and constitute a part of this specification, illustrate embodiments consistent with the present disclosure and, together with the description, serve to explain the principles of the present disclosure.

FIG. 1 is a flowchart of a method provided in an embodiment of the present application;

FIG. 2 is a flowchart of another method provided in an embodiment of the present application;

DETAILED DESCRIPTION

Figure 3:
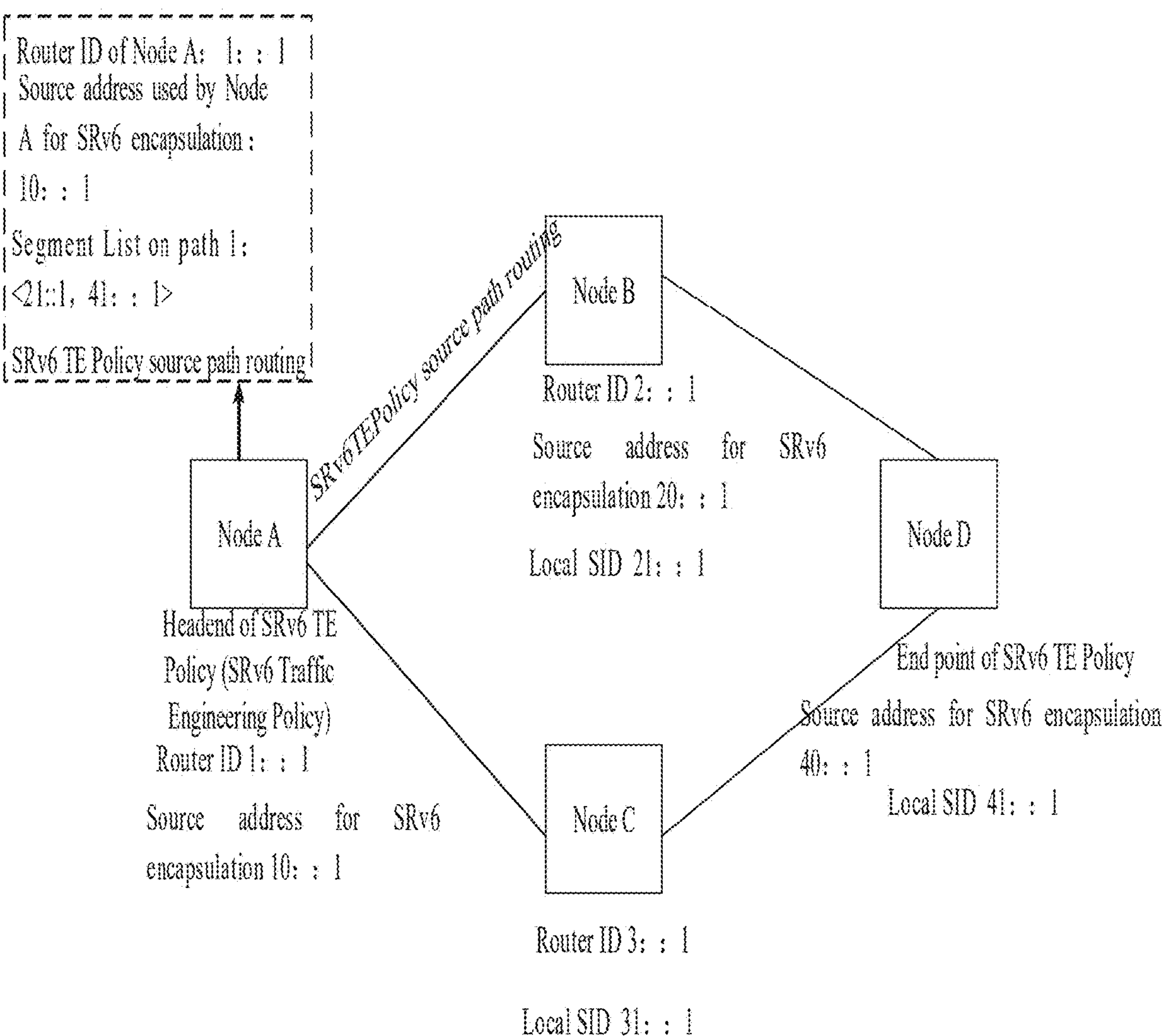
FIGS. 3 to 8 are schematic diagrams of embodiments of the present application.

In order to enable those skilled in the art to better understand technical solutions of embodiments of the present application, and to make the above objectives, technical solutions and advantages of the embodiments of the present application more apparent, the present disclosure will be described in detail the technical solutions of the embodiments of the present application will be described in more detail with reference to the accompanying drawings.

The method provided in an embodiment of the present application will be described in the following using a Headend applied to SRv6 TE Policy as an example.

Refer to FIG. 1, which is a flowchart of the method provided in an embodiment of the present application. This method is applied to a network node in an SRv6 network.

As shown in FIG. 1, the process may include the following steps.

In Step 101, the network node serving as a headend of an SRv6 TE Policy sends to other nodes on a current path included in the SRv6 TE Policy an SRv6 TE Policy source path routing.

In a specific application, an SRv6 TE Policy can include a plurality of paths with different priorities. As an example, the current path here can be one available path (also known as a primary path for a service) in the SRv6 TE Policy determined based on service requirements.

In this embodiment, the SRv6 TE Policy source path routing carries first routing information for forwarding packets on the current path. Optionally, the first routing information here may include: a routing identifier (RouterID) of the headend, a source IPv6 address used by the headend for SRv6 encapsulation, and a Segment List of the current path. Here, the Segment List of the current path contains SIDs of respective nodes other than the headend on the current path.

When the headend sends the SRv6 TE Policy source path routing to other nodes on the current path, any node other than the headend on the current path will record the first routing information carried by the SRv6 TE Policy source path routing upon receiving the SRv6 TE Policy source path routing. The specific process is shown in FIG. 2.

In Step 102, the network node serving as the headend sends to other nodes on the current path a source path control probe packet for probing the current path; the source path control probe packet carries second routing information for forwarding packets on the current path, so that any node other than the headend on the current path, when recognizing that the second routing information carried by the source path control probe packet matches with the recorded first routing information, generates a source path control table that matches with the first routing information; any node other than the headend on the current path is configured to perform forwarding control on a received service packet based on the generated source path control table.

Assuming that the first routing information includes a RouterID of the headend, a source IPv6 address used by the headend for SRv6 encapsulation, and a Segment List of the current path (including SIDs of respective nodes other than the headend on the current path), then as an embodiment, the second routing information may also include a RouterID of the headend, a source IPv6 address used by the headend for SRv6 encapsulation, and a Segment List of the current path, which includes SIDs of respective nodes other than the headend on the current path.

As an embodiment, in order to ensure that the source path control probe packet carries such second routing information, in this embodiment, the source path control probe packet can encapsulate an IPv6 primary header, an SRv6 packet header (SRH: Segment Routing Header), and a RouterID header.

Here, the IPv6 primary header contains at least a source address field, which carries a source IPv6 address used by the headend for SRv6 encapsulation.

The SRH includes at least: a Routing Type field, a Next Header field, and a Segment List field. Here, the Routing Type field carries a first value such as 254, which is used to indicate that the packet is a source path control probe packet. The Next Header field carries a second value, such as 254, which is used to indicate that the next packet header of the SRH carries the RouterID of the headend. The Segment List field carries the Segment List of the current path, which includes SIDs of respective nodes other than the headend on the current path.

The RouterID header carries the RouterID of the headend.

Based on this, it can be seen that the second routing information mentioned above includes: the RouterID of the headend carried in the RouterID header, the Segment List carried in the Segment List field, and the source IPv6 address carried in the source address field.

As for how any node other than the headend on the current path recognizes that the second routing information carried by the source path control probe packet matches with the recorded first routing information, description of an example will be given below, which will not be elaborated here. If any node other than the headend on the current path recognizes that the second routing information carried by the source path control probe packet matches with the recorded first routing information, the node will generate a source path control table that matches with the first routing information.

As an example, the source path control table here may include routing forwarding information that nodes on the existing SRv6 TE Policy path conventionally did not care about, such as whether the source IPv6 address of the headend is correct, whether the Segment List is correct, etc. While in this embodiment, the routing forwarding information that nodes on the existing SRv6 TE Policy path conventionally did not care about is recorded in the source path control table; then, the source path control table can be used to perform forwarding control on the received service packet, in order to mitigate the potential risk by means of such source path control table, which would be otherwise caused by nodes on the existing SRv6 TE Policy path not caring about the routing forwarding information. This can effectively hinder packet impersonation from infiltrating the SRv6 network, suppress network attacks, and improve the security of the SRv6 network. Description of an example will be given below, which will not be elaborated here.

Thus, the process shown in FIG. 1 is completed.

A method provided in an embodiment of the present application will be described in the following from the perspective of any node other than the headend on the current path included in the SRv6 TE Policy.

Refer to FIG. 2, which is a flowchart of another method provided in an embodiment of the present application. This method is applied to any node other than the headend on the current path.

As shown in FIG. 2, the process may include the following steps.

In Step 201, it is received an SRv6 TE Policy source path routing sent by a headend of the SRv6 TE Policy for the current path included in the SRv6 TE Policy, and the SRv6 TE Policy source path routing carries first routing information used for forwarding packets on the current path.

This step 201 corresponds to step 101 mentioned above.

In Step 202, it is recognized whether the present node is on the current path, and if so, the first routing information carried by the SRv6 TE Policy source path routing is recorded.

As an embodiment, the first routing information includes at least a Segment List. The Segment List contains SIDs of respective nodes other than the headend on the current path. Based on this, in step 202, recognizing whether the present node is on the current path includes: recognizing whether the SID of the present node is in the Segment List; if it is, determining that the present node is on the current path; otherwise, determining that the present node is not on the current path.

Optionally, if the present node is not on the current path, the received SRv6 TE Policy source path routing can be ignored.

In Step 203, it is received a source path control probe packet sent by the headend; the source path control probe packet carries second routing information for forwarding packets on the current path. If it is recognized that the second routing information carried by the source path control probe packet matches with the recorded first routing information, a source path control table matching with the first routing information is generated.

Step 203 corresponds to step 102 mentioned above.

Specifically, in step 203, receiving the source path control probe packet sent by the headend for probing the current path includes: receiving the packet sent by the headend; if the packet type carried by the packet is a first value, which is used to indicate a source path control probe packet, determining that the source path control probe packet sent by the headend has been received.

As an example, the received source path control probe packet encapsulates an IPv6 primary header, an SRv6 packet header SRH, and a RouterID header.

Here, the IPv6 primary header contains at least a source address field, which carries a source IPv6 address used by the headend for SRv6 encapsulation.

Here, the SRH includes at least: a Routing Type field, a Next Header field, and a Segment List field.

As an example, the Routing Type field carries a first value, which is used to indicate a source path control probe packet. Based on this, when it is recognized that the Routing Type field carrying the first value, the packet is determined to be a source path control probe packet. The Next Header field carries a second value, such as 254. The second value, such as 254, is used to indicate that the next packet header of SRH carries the RouterID of the headend. The Segment List field carries the Segment List of the current path, which includes SIDs of respective nodes other than the headend on the current path.

Here, the RouterID header carries the RouterID of the headend.

Based on the description of the source path control probe packet above, in this embodiment, the second routing information includes at least: the RouterID of the headend carried in the RouterID header, the Segment List carried in the Segment List field, and the source IPv6 address carried in the source address field.

Based on this, in Step 203 above, recognizing whether the second routing information carried by the source path control probe packet matches with the recorded first routing information may include:

determining whether the RouterID carried by the source path control probe packet and the RouterID in the recorded first routing information meet a first preset matching requirement, whether the source IPv6 address carried by the source path control probe packet and the source IPv6 address in the recorded first routing information meet a second preset matching requirement, and whether the Segment List carried by the source path control probe packet and the Segment List in the recorded first routing information meet a third preset matching requirement. If all of the requirements are met, it is determined that the second routing information carried by the source path control probe packet matches with the recorded first routing information; otherwise, it is determined that the second routing information carried by the source path control probe packet does not match with the recorded first routing information.

Optionally, the first preset matching requirement, the second preset matching requirement, and the third preset matching requirement mentioned above may be the same, such as being equal or having an approximation that meets the preset requirement, which is not specifically limited in this embodiment.

In this embodiment, the IPv6 primary header also includes a destination address field; The above-mentioned SRH also includes an SL field, which carries SL. Here, SL indicates a number of remaining SIDs in the Segment List mentioned above, where the remaining SIDs refer to the segment identifiers SIDs corresponding to nodes that the source path control probe packet has not yet passed through.

Based on this, as an embodiment, the source path control table matched with the first routing information above includes at least: an interface where the source path control probe packet is received, the source IPv6 address carried in the source address field, the destination address carried in the destination address field, the Segment List carried in the source path control probe packet, and the SL mentioned above.

It should be noted that in the process shown in FIG. 2, for any node other than the headend on the current path, if it is found that the present node is not the last node on the current path (for example, if SL is not 0, it is determined that the present node is not the last node on the current path), the source path control probe packet will be modified and forwarded as follows: modifying the destination address field in the source path control probe packet to the node identifier of the next node following the present node on the current path, and update the number in the SL field, to obtain an updated number less than the number before updating by 1.

In Step 204, based on the source path control table, forwarding control is performed on a service packet received by the present node.

Based on the above source path control table, in step 204, performing forwarding control on a service packet received by the present node may include: checking whether the interface where the service packet is received, the source IPv6 address and the destination address encapsulated in the service packet, and the Segment List and SL encapsulated in the service packet respectively match with the ingress interface, the source IPv6 address, the destination address, the Segment List, and the SL in the source path control table, if so, forwarding the service packet is proceeded; and if not, discarding the service packet.

According to the existing forwarding process of SRv6 TE Policy, network nodes on the path included in SRv6 TE Policy do not care about routing forwarding information such as whether the ingress interface of the packet is correct, whether the source address of the packet is correct, and whether the Segment List carried in the SRH header is correct when receiving a service packet. Instead, the network nodes directly forward the service packet based in the Segment List in the service packet. While in this embodiment, when receiving a service packet, a node does not directly forward the service packet based in the Segment List and SL in the service packet. Instead, the node first focuses on whether the ingress interface of the packet is correct, whether the source address of the packet is correct, whether the destination address is correct, and whether the Segment List carried in the SRH header is correct. This can avoid the risks caused by not paying attention to such information and ensures the security of the SRv6 network.

The method provided in the embodiment of the present application has been described above, and the present application will be described below through a specific example.

Applied to the SRv6 network shown in FIG. 3, taking the current path of SRv6 TE Policy as the following path (referred to as path 1) as an example: Node A→Node B→Node D, then Node A serves as the headend and releases the SRv6 TE Policy source path routing.

Optionally, in this embodiment, the releasing of SRv6 TE Policy source path routing can be achieved by extending BGP to define a Source Path Address Family for SRv6 TE Policy source path routing. Taking the extension of BGP to define the SRv6 TE Policy source path routing address family as an example, Nodes A, B, C, and D in the SRv6 network shown in FIG. 3 will establish BGP neighbors with the BGP routing reflector (not shown in FIG. 3). Node A will release the SRv6 TE Policy source path routing to the BGP routing reflector, and the BGP routing reflector will release the SRv6 TE Policy source path routing to all other BGP neighbors.

As an example, the SRv6 TE Policy source path routing released by Node A contains the following first routing information: a RouterID of Node A, a source IPv6 address used by Node A for SRv6 encapsulation, and a Segment list (here, the Segment list is specifically:<21::1, 41::1) for path 1 in the configured SRv6 TE Policy for Node A. FIG. 3 also illustrates SRv6 TE Policy source path routing as an example.

Figure 4:
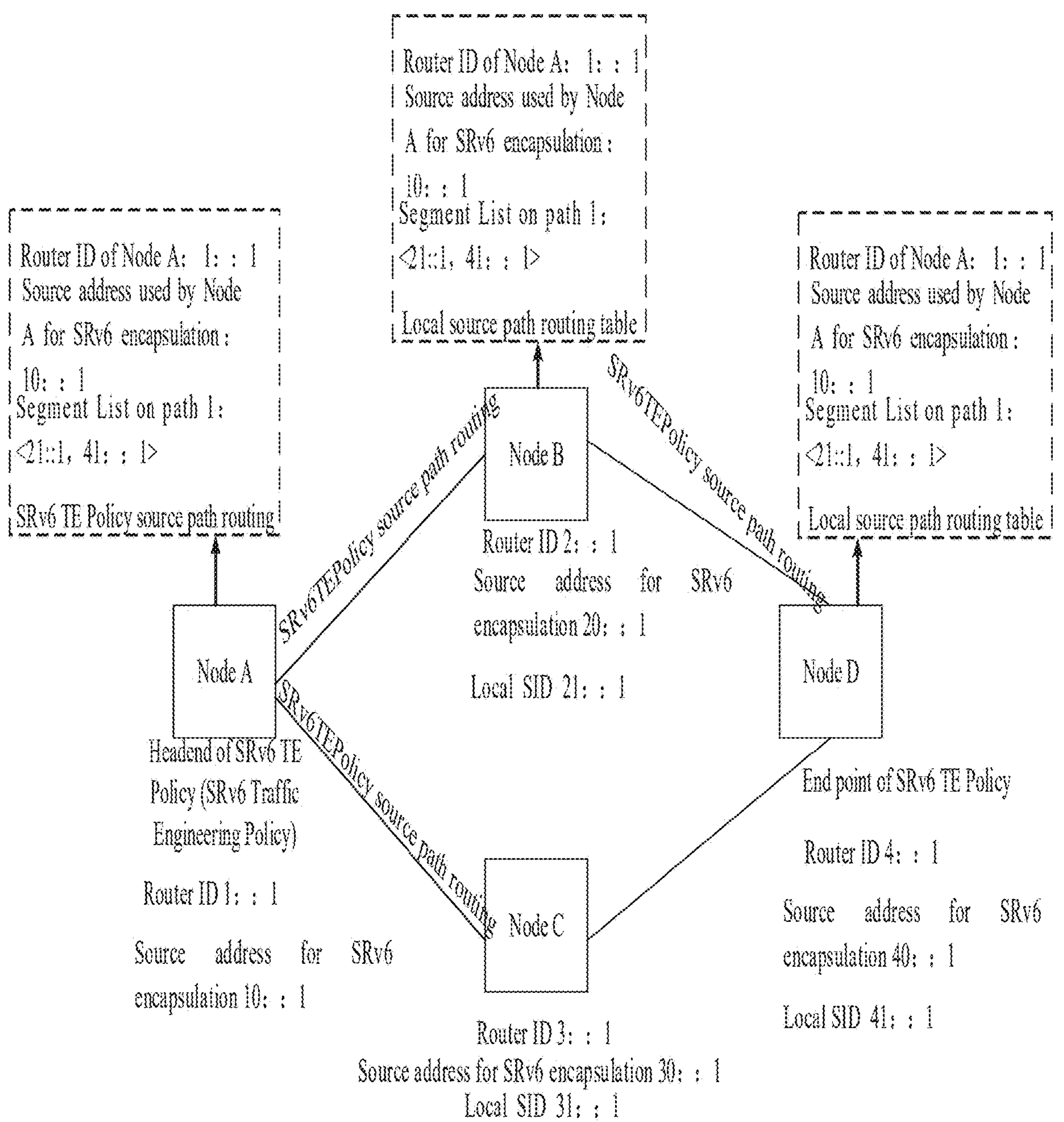

Any node in the SRv6 network, upon receiving the SRv6 TE Policy source path routing, determines whether the Segment list carried by the SRv6 TE Policy source path routing contains the SID of the node. If so, the node generates a local source path routing table. The local source path routing table records the first routing information carried by the SRv6 TE Policy source path routing: the RouterID of the headend, the source IPv6 address used by the headend for SRv6 encapsulation, and the Segment list (<21::1, 41:1) of path 1 in the SRv6 TE Policy configured for the headend. Nodes B and D as shown in FIG. 4, upon receiving the SRv6 TE Policy source path routing, will find that the Segment list carried by the SRv6 TE Policy source path routing contains the SIDs of the local nodes, and generate a local source path routing table.

However, if any node in the SRv6 network receives an SRv6 TE Policy source path routing and determines that the Segment list carried by the SRv6 TE Policy source path routing does not include the SID of the node, then the SRv6 TE Policy source path routing will not be processed. Node C shown in FIG. 4 will determine that the Segment list carried by the SRv6 TE Policy source path routing does not contain the SID of the present node, and will not process the SRv6 TE Policy source path routing.

Figure 5:
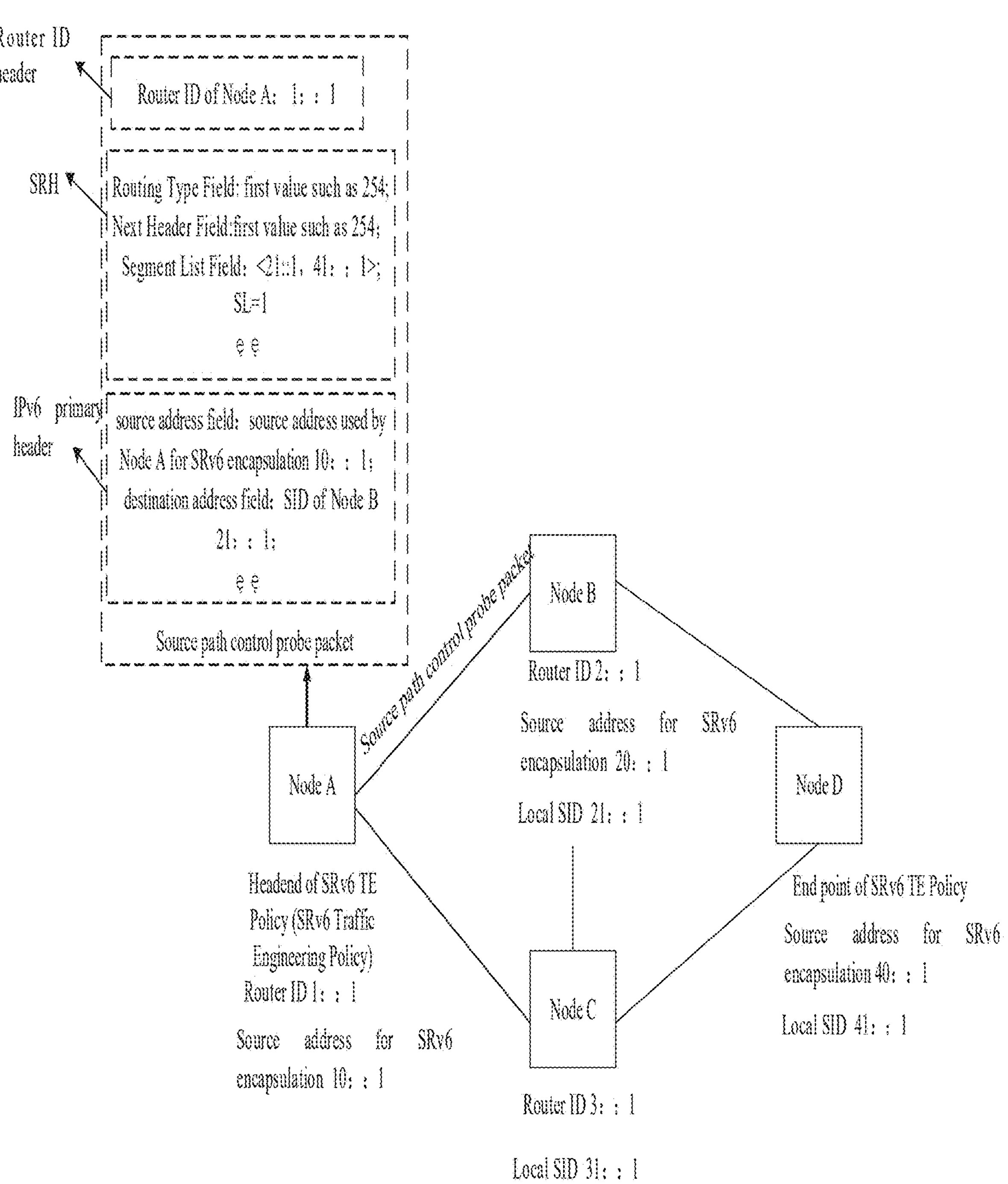

Node A, as the headend, will send a source path control probe packet to other nodes on path 1 after confirming that the SRv6 TE Policy source path routing released by Node A have reached all other nodes on path 1, as shown in FIG. 5. In this embodiment, Node A confirming that the SRv6 TE Policy source path routing it has released have reached all other nodes on path 1 can be achieved through time. For example, a preset duration is determined based on experience, and once a preset duration has elapsed since Node A released the SRv6 TE Policy source path routing, it can be determined that the SRv6 TE Policy source path routing it released have reached all other nodes on path 1.

In this embodiment, the source path control probe packet encapsulates an IPv6 primary header, an SRv6 packet header SRH, and a RouterID header.

Here, the IPv6 primary header contains at least a source address field and a destination address field. The source address field carries a source IPv6 address of the headend used for SRv6 encapsulation. The destination address field is the SID of Node B, which is the next node following the headend on path 1.

The SRH includes at least: a Routing Type field, a Next Header field, a Segment List field, and an SL field. The Routing Type field carries a first value, such as 254, which is used to indicate a source path control probe packet. The Next Header field carries a second value, such as 254, which is used to indicate that the next packet header of the SRH carries the RouterID of the headend. The Segment List field carries the Segment List of the current path, which includes segment identifier SIDs of respective nodes other than the headend on the current path. The SL field carries an SL of 1. The RouterID header carries the RouterID of the headend.

Figure 6:
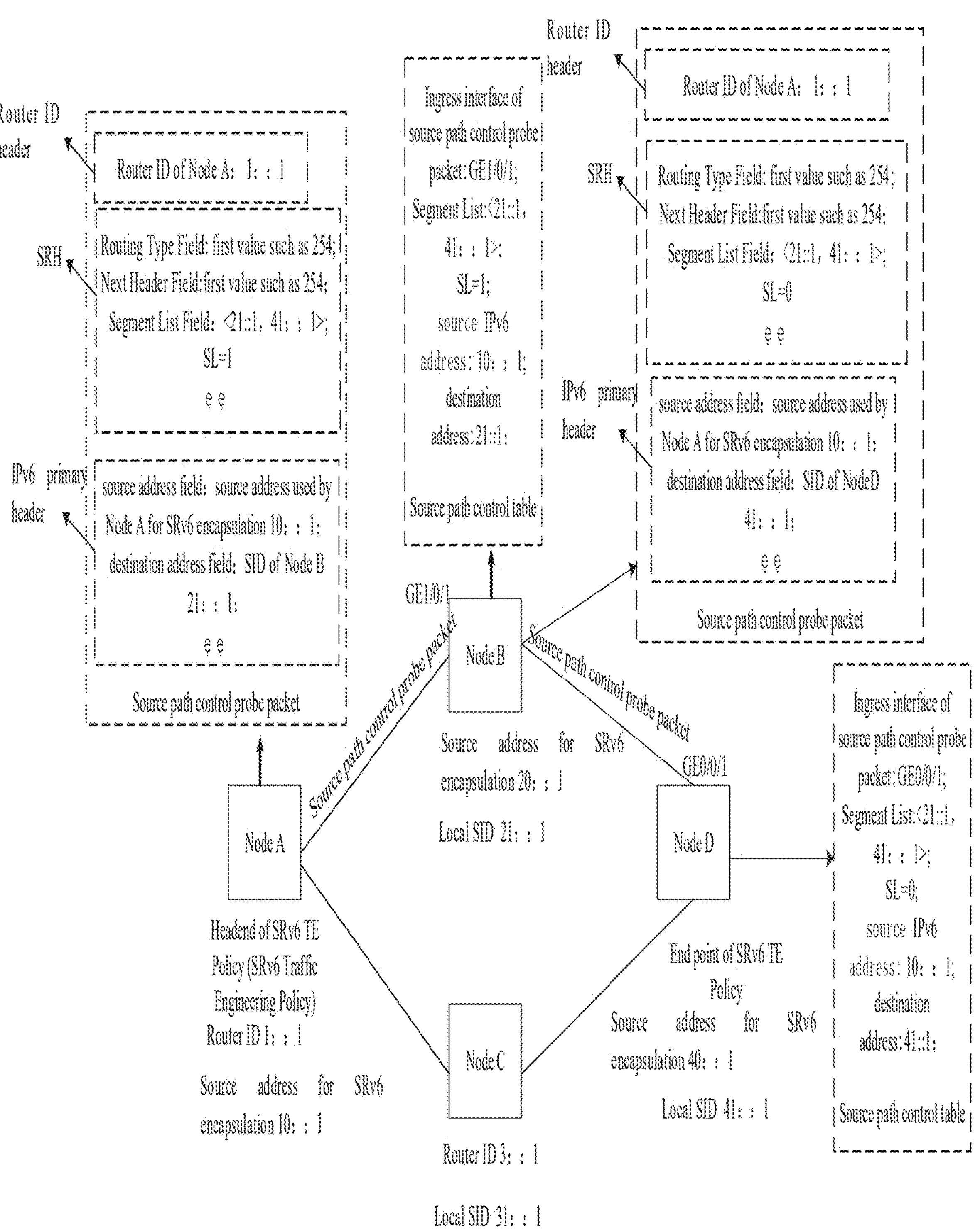

As shown in FIG. 6, Node B on path 1 receives a source path control probe packet. If the Routing Type field in the SRH carries a first value of 254 (decimal), Node B confirms that it is a source path control probe packet. Node B parses the source path control probe packet and obtains the following second routing information: a source IPv6 address, a Segment List, and a RouterID. If Node B finds that the source IPv6 address, the Segment List, and the RouterID in the second routing information match with the source IPv6 address, the Segment List, and the RouterID in the first routing information, Node B generates a source path strict control table that matches with the first routing information.

As shown in FIG. 6, the source path control table matched with the first routing information includes at least: the ingress interface of the received source path control probe packet, the source IPv6 address carried in the source address field, the destination address carried in the destination address field, the Segment List carried in the source path control probe packet, and the SL mentioned above.

If Node B is not the end point of Path 1, Node B will forward the source path control probe packet based on the SRv6 TE Policy forwarding process. Specifically, Node B makes the following modifications to the source path control probe packet and proceeds to forward the packet: modifying the destination address field in the source path control probe packet to the node identifier of the next node following the present node on the current path, and updating the number in the SL field, to obtain an updated number less than the number before updating by 1. At this point, as shown in FIG. 6, the destination address field of the source path control probe packet carries the SID of Node D and SL is 0.

As shown in FIG. 6, Node D on path 1 receives a source path control probe packet. If the Routing Type field in the SRH carries a first value of 254 (decimal), Node D confirms that the packet is a source path control probe packet. Node D parses the source path control probe packet and obtains the following second routing information: a source IPv6 address, a Segment List, and a RouterID. If Node D finds that the source IPv6 address, the Segment List, and the RouterID in the second routing information match with the source IPv6 address, the Segment List, and the RouterID in the first routing information, Node D generates a source path strict control table that matches with the first routing information.

As shown in FIG. 6, the source path control table matched with the first routing information includes at least: the ingress interface of the received source path control probe packet, the source IPv6 address carried in the source address field, the destination address carried in the destination address field, the Segment List carried in the source path control probe packet, and the SL mentioned above.

If Node D is the end point of path 1, Node D will no longer forward the source path control probe packet.

Ultimately, the nodes other than the headend on path 1 will generate source path control probe packets that match with the first routing information mentioned above. Afterwards, the nodes other than the headend on path 1 will use the source path control probe packet matching with the first routing information to forward and control the received service packet. Taking Node B shown in FIG. 8 as an example, upon receiving a service packet, Node B checks whether the interface where the service packet is received, the source IPv6 address and destination address encapsulated in the service packet, and the Segment List and SL encapsulated in the service packet match with the ingress interface, the source IPv6 address, the destination address, the Segment List, and the SL in the source path control table. If so, Node B proceeds to forward the service packet. If not, the service packet is discarded.

Figure 7:
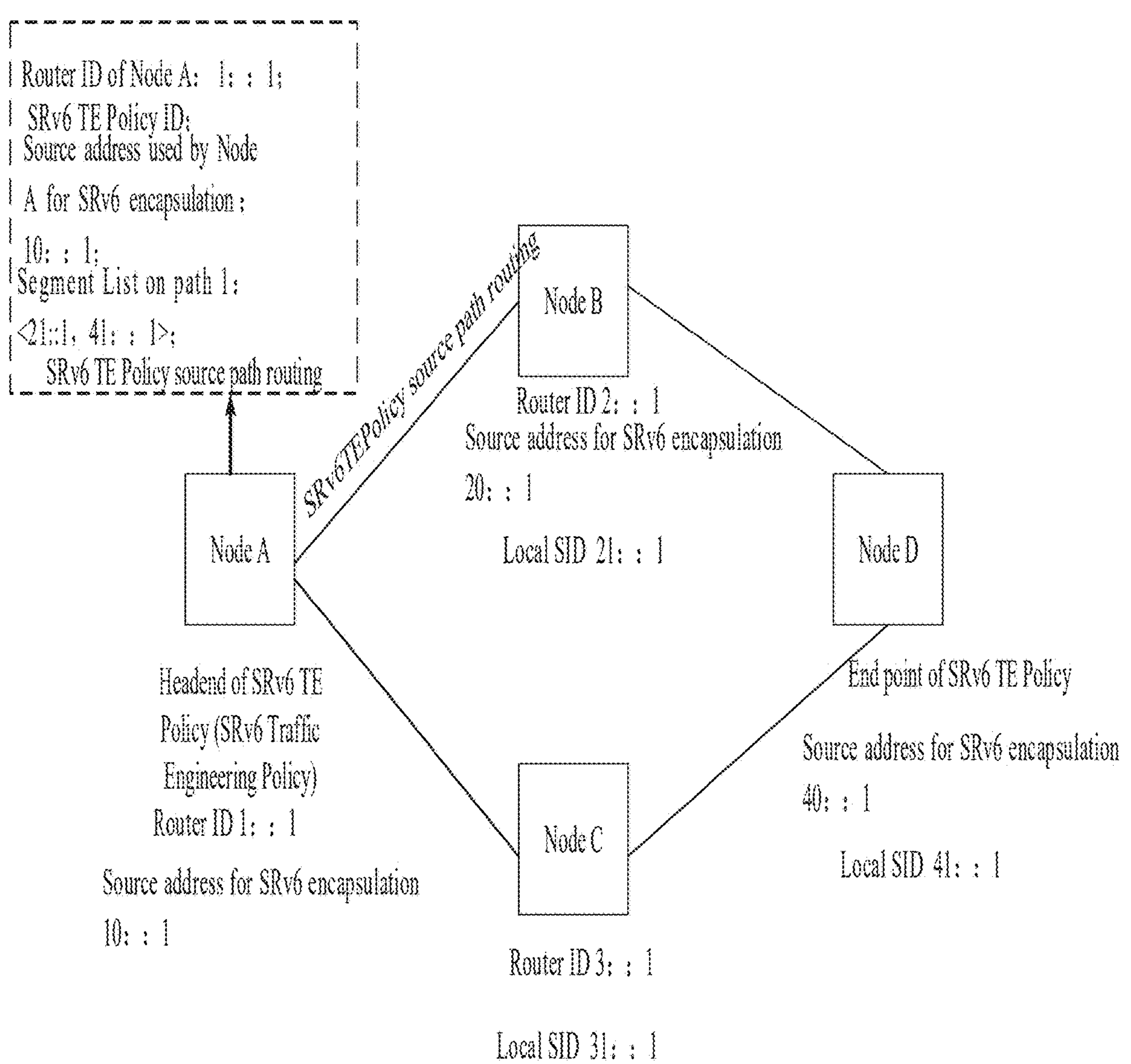

In this embodiment, the SRv6 TE Policy source path routing released by the headend also includes an identifier (ID) of the SRv6 TE Policy, as illustrated in FIG. 7. Optionally, the value range of SRv6 TE Policy ID here is, for example, 1 to 65535. Any SRv6 TE Policy ID can be used to uniquely identify the SRv6 TE Policy.

Figure 8:
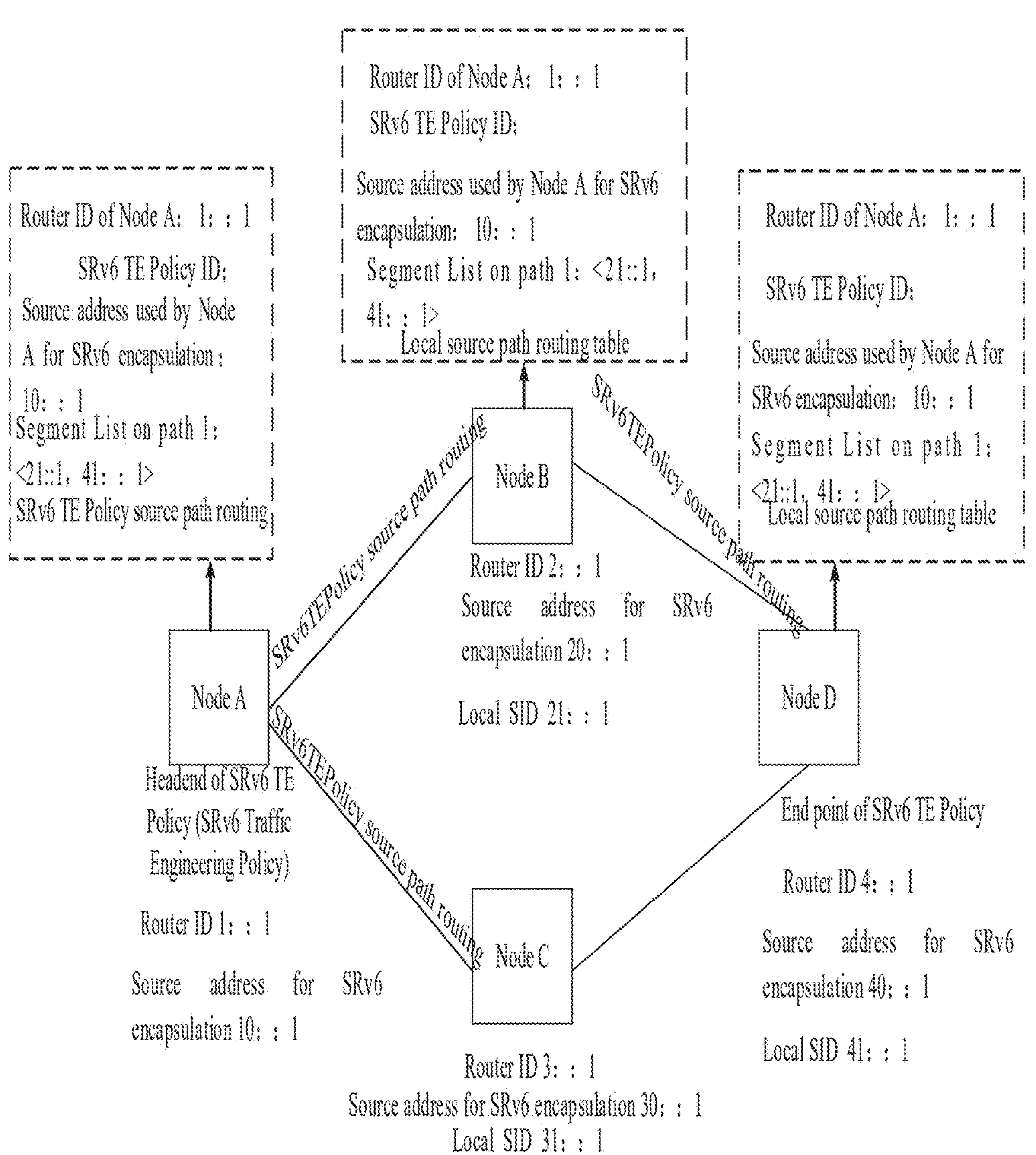

Based on this, the nodes other than the headend on path 1, upon receiving the SRv6 TE Policy source path routing, will recognize whether there is routing information associated with the SRv6 TE Policy ID is recorded. If not, the first routing information carried by the current received SRv6 TE Policy source path routing will be associated with the SRv6 TE Policy ID and recorded; if so, the routing information associated with the SRv6 TE Policy ID and the source path control table that matches the routing information will be deleted, and the SRv6 TE Policy ID will be associated and recorded with the first routing information carried by the currently received SRv6 TE Policy source path routing. This enables timely updates of routing, as illustrated in FIG. 8.

The above improvements have been made to the method provided in the embodiment of the present application. An apparatus provided in an embodiment of the present application will be described in the following.

Figure 9:
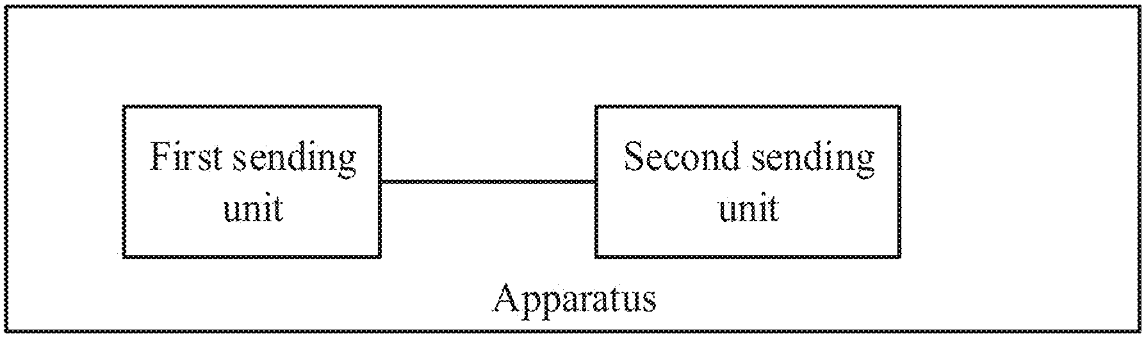
FIG. 9 is a block diagram of an apparatus provided in an embodiment of the present application.

Refer to FIG. 9, which is a block diagram of an apparatus provided in an embodiment of the present application. The apparatus corresponds to the process shown in FIG. 1. The apparatus is applied to a network node, which serves as the headend of the SRv6 Traffic Engineering Policy TE Policy. The apparatus includes:

a first sending unit configured to send to other nodes on a current path included in the SRv6 TE Policy an SRv6

TE Policy source path routing; the SRv6 TE Policy source path routing carrying first routing information for forwarding packets on the current path, so that any node other than the headend on the current path, upon receiving the SRv6 TE Policy source path routing, records the first routing information carried by the SRv6 TE Policy source path routing;

a second sending unit configured to send to other nodes on the current path, a source path control probe packet for probing the current path; the source path control probe packet carrying second routing information for forwarding packets on the current path, so that any node other than the headend on the current path, when recognizing that the second routing information carried by the source path control probe packet matches with the recorded first routing information, generates a source path control table that matches with the first routing information; any node other than the headend on the current path being configured to perform forwarding control on a received service packet based on the generated source path control table, to suppress network attacks.

As an embodiment, the first routing information includes: a routing identifier RouterID of the headend, a source IPv6 address used by the headend for SRv6 encapsulation, and a segment list (Segment List); the Segment List contains segment identifiers SIDs of respective nodes other than the headend on the current path;

the second routing information includes: a routing identifier RouterID of the headend, a source IPv6 address used by the headend for SRv6 encapsulation, and a segment list (Segment List) of the current path, which contains segment identifiers SIDs of respective nodes other than the headend on the current path.

As an embodiment, the source path control probe packet encapsulates an IPv6 primary header, an SRv6 packet header SRH, and a RouterID header.

Here, the IPv6 primary header includes at least a source address field, which carries the source IPv6 address used by the headend for SRv6 encapsulation.

The SRH includes at least: a Routing Type field, a Next Header field, and a Segment List field. The Routing Type field carries a first value, which is used to indicate a source path control probe packet. The Next Header field carries a second value, which is used to indicate that the next packet header of the SRH carries the routing identifier RouterID of the headend. The Segment List field carries the Segment List of the current path, which includes segment identifiers SIDs of respective nodes other than the headend on the current path.

The RouterID header carries the routing identifier RouterID of the headend.

The second routing information includes: the RouterID of the headend carried in the RouterID header, the Segment List carried in the Segment List field, and the source IPv6 address carried in the source address field.

As an embodiment, when the current path is abnormal, the first sending unit further takes a backup path of the current path in the SRv6 TE Policy as the current path, and returns to the step of sending the SRv6 TE Policy source path routing to other nodes on the current path included in the SRv6 TE Policy.

As an embodiment, the SRv6 TE Policy source path routing further includes: an identifier ID of the SRv6 TE Policy.

The SRv6 TE Policy ID is used so that, when any node other than the headend on the current path, upon currently receiving the SRv6 TE Policy source path routing, finds that the SRv6 TE Policy ID has not been recorded, the node associates and records the first routing information carried by the currently received SRv6 TE Policy source path routing with the SRv6 TE Policy ID; if the SRv6 TE Policy ID has already been recorded, the node deletes the routing information associated with the SRv6 TE Policy ID and the source path control table matching with the routing information, and associates and records the SRv6 TE Policy ID with the first routing information carried by the currently received SRv6 TE Policy source path routing.

Figure 10:
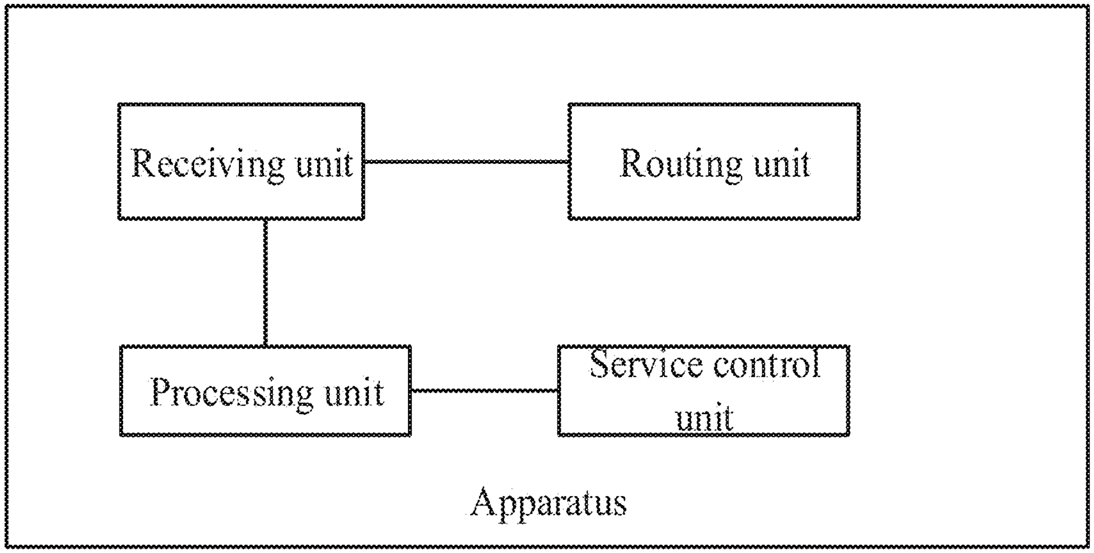
FIG. 10 is a block diagram of another apparatus provided in an embodiment of the present application.

The present embodiment also provides block diagram of another apparatus. Refer to FIG. 10, which is a block diagram of an apparatus provided in an embodiment of the present application. This apparatus corresponds to the process shown in FIG. 2. The apparatus is applied to a network node, which serves as any node other than the headend of the SRv6 Traffic Engineering Policy TE Policy. The apparatus includes:

a receiving unit configured to receive an SRv6 TE Policy source path routing sent by a headend of the SRv6 TE Policy for the current path included in the SRv6 TE Policy; the SRv6 TE Policy source path routing carries first routing information for forwarding packets on the current path;

a routing unit configured to recognize whether the present node is on the current path, and if so, record the first routing information carried by the SRv6 TE Policy source path routing;

the receiving unit further configured to receive a source path control probe packet sent by the headend; the source path control probe packet carries second routing information for forwarding packets on the current path;

a processing unit configured to generate a source path control table matching with the first routing information if recognizing that the second routing information carried by the source path control probe packet matches with the first routing information already recorded;

a service control unit configured to perform forwarding control on a service packet received by the present node based on the source path control table, in order to suppress network attacks.

As an embodiment, the first routing information includes at least: a Segment List. The Segment List contains segment identifiers SIDs of respective nodes other than the headend on the current path.

The process of recognizing whether the present node is on the current path includes: recognizing whether the segment identifier SID of the present node is in the Segment List; if it is, determining that the present node is on the current path; otherwise, determining that the present node is not on the current path.

As an embodiment, the first routing information includes: a routing identifier RouterID of the headend, a source IPv6 address used by the headend for SRv6 encapsulation, and the segment list (Segment List). The Segment List contains segment identifiers SIDs of respective nodes other than the headend on the current path.

The second routing information includes: the routing identifier RouterID of the headend, the source IPv6 address used by the headend for SRv6 encapsulation, and the segment list (Segment List) of the current path, which includes the segment identifiers SIDs of respective nodes other than the headend on the current path.

The recognizing whether the second routing information carried by the source path control probe packet matches with the recorded first routing information includes: if the RouterID carried by the source path control probe packet and the RouterID in the recorded first routing information meet a first preset matching requirement, the source IPv6 address carried by the source path control probe packet and the source IPv6 address in the recorded first routing information meet a second preset matching requirement, and the Segment List carried by the source path control probe packet and the Segment List in the recorded first routing information meet a third preset matching requirement, determining that the second routing information carried by the source path control probe packet matches with the recorded first routing information.

As an embodiment, receiving a source path control probe packet sent by the headend for probing the current path includes:

receiving a packet sent by the headend;

if the packet type carried by the packet is the first value which indicates a source path control probe packet, determining that the source path control probe packet sent by the headend has been received.

As an embodiment, the source path control probe packet encapsulates an IPv6 primary header, an SRv6 packet header SRH, and a RouterID header.

Here, the IPv6 primary header includes at least a source address field, which carries the source IPv6 address used by the headend for SRv6 encapsulation.

The SRH includes at least: a Routing Type field, a Next Header field, and a Segment List field. The Routing Type field carries a first value, which is used to indicate a source path control probe packet. The Next Header field carries a second value, which is used to indicate that the next packet header of the SRH carries the routing identifier RouterID of the headend. The Segment List field carries the Segment List of the current path, which includes the segment identifier SIDs of respective nodes other than the headend on the current path.

The RouterID header carries the routing identifier RouterID of the headend.

The second routing information includes at least: the routing identifier RouterID of the headend carried in the RouterID header, the Segment List carried in the Segment List field, and the source IPv6 address carried in the source address field.

As an embodiment, the IPv6 primary header further includes a destination address field. The SRH further includes an SL field carrying SL, which indicates a number of remaining segment identifiers SIDs in the Segment List. The remaining segment identifiers SIDs refer to segment identifiers SIDs corresponding to nodes that the source path control probe packet has not yet passed through.

The source path control table matched with the first routing information includes at least: an interface where the source path control probe packet is received, the source IPv6 address carried in the source address field, the destination address carried in the destination address field, the Segment List carried in the source path control probe packet, and the SL.

The performing forwarding control on a service packet received by the present node based on the source path control table includes: checking whether the interface where the service packet is received, the source IPv6 address and the destination address encapsulated in the service packet, and the Segment List and the SL encapsulated in the service packet respectively match with the ingress interface, the source IPv6 address, the destination address, the Segment List, and the SL in the source path control table, if so, proceeding to forward the service packet is proceeded; and if not, discarding the service packet.

As an embodiment, the processing unit is further configured to, when the network node is not the last node of the current path, modify the source path control probe packet and proceed to forward the packet by: modifying the destination address field in the source path control probe packet to a node identifier of a next node following the present node on the current path, and update the number in the SL field to obtain an updated number less than the number before updating by 1.

As an embodiment, the SRv6 TE Policy source path routing further includes: an identifier ID of the SRv6 TE Policy.

The recording the first routing information carried by the SRv6 TE Policy source path routing includes: recognizing whether the routing information associated with the SRv6 TE Policy ID is currently recorded, and if not, associating and recording the first routing information carried by the SRv6 TE Policy source path routing currently received with the SRv6 TE Policy ID; if so, deleting the routing information associated with the SRv6 TE Policy ID and the source path control table that matches with the routing information, and associating and recording the SRv6 TE Policy ID with the first routing information carried by the current received SRv6 TE Policy source path routing.

Figure 11:
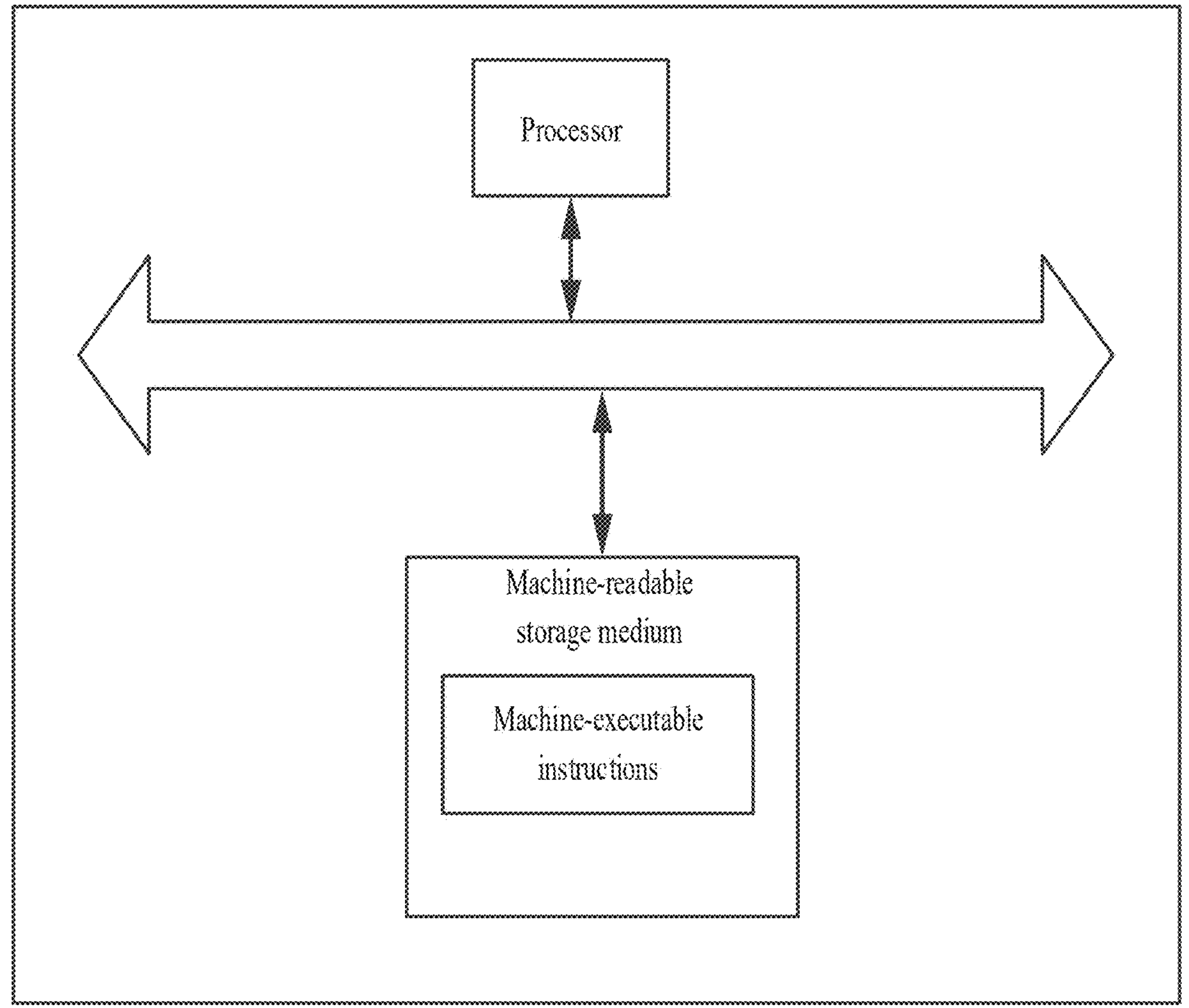
FIG. 11 is a block diagram of an electronic device provided in an embodiment of the present application.

The present embodiment also provides a hardware structure of the apparatus shown in FIG. 9 or FIG. 10. Refer to FIG. 11, which is a block diagram of an electronic device provided in an embodiment of the present application. As shown in FIG. 11, the hardware structure may include: a processor and a machine-readable storage medium, wherein the machine-readable storage medium stores machine-executable instructions that can be executed by the processor; The processor is used to execute the machine-executable instructions to implement the methods disclosed in the above examples of the present application.

Based on the same application concept as the above method, the present embodiment also provides a machine-readable storage medium, which stores some computer instructions. When the computer instructions are executed by a processor, the methods disclosed in the above examples of the present application can be implemented.

For example, the above-mentioned machine-readable storage medium can be any electronic, magnetic, optical, or other physical storage device that can contain or store information such as executable instructions, data, and so on. For example, machine-readable storage media can be: RAM (Random Access Memory), volatile memory, non-volatile memory, flash memory, storage drives (such as hard drives), solid-state drives, any type of storage disk (such as CDs, DVDs, etc.), or similar storage media, or a combination thereof.

The above description is only an embodiment of the present application and is not intended to limit the present application. For those skilled in the art, this application may have various modifications and variations. Any modifications, equivalent substitutions, improvements, etc. made within the spirit and principles of this application shall be included within the scope of the claims of this application.

What is claimed is:

1. A packet forwarding method, the method applied to a network node, and the method comprising:

sending, by the network node serving as a headend of an SRv6 Traffic Engineering Policy TE Policy to other nodes on a current path included in the SRv6 TE Policy, an SRv6 TE Policy source path routing; the SRv6 TE Policy source path routing carrying first routing information for forwarding packets on the current path, so that any node other than the headend on the current path, upon receiving the SRv6 TE Policy source path routing, records the first routing information carried by the SRv6 TE Policy source path routing;

sending, by the network node serving as the headend to other nodes on the current path, a source path control probe packet for probing the current path; the source path control probe packet carrying second routing information for forwarding packets on the current path, so that any node other than the headend on the current path, when recognizing that the second routing information carried by the source path control probe packet matches with the recorded first routing information, generates a source path control table that matches with the first routing information; any node other than the headend on the current path being configured to perform forwarding control on a received service packet based on the generated source path control table.

2. The method of claim 1, wherein the first routing information comprises: a routing identifier RouterID of the headend, a source IPv6 address used by the headend for SRv6 encapsulation, and a segment list Segment List; the Segment List containing segment identifiers SIDs of respective nodes other than the headend on the current path;

the second routing information comprises: a routing identifier RouterID of the headend, a source IPv6 address used by the headend for SRv6 encapsulation, and a segment list Segment List of the current path, the Segment List containing segment identifiers SIDs of respective nodes other than the headend on the current path.

3. The method of claim 1, wherein the source path control probe packet encapsulates an IPv6 primary header, an SRv6 packet header SRH, and a RouterID header;

wherein the IPv6 primary header comprises at least a source address field carrying the source IPv6 address used by the headend for SRv6 encapsulation;

the SRH comprises at least: a Routing Type field, a Next Header field, and a Segment List field; the Routing Type field carries a first value used to indicate a source path control probe packet; the Next Header field carries a second value used to indicate that a next packet header of the SRH carries the routing identifier RouterID of the headend; the Segment List field carries the Segment List of the current path including the segment identifiers SIDs of respective nodes other than the headend on the current path;

the RouterID header carries the routing identifier RouterID of the headend;

the second routing information comprises: the routing identifier RouterID of the headend carried in the RouterID header, the Segment List carried in the Segment List field, and the source IPv6 address carried in the source address field.

4. The method of claim 1, further comprising:

the network node serving as the headend taking a backup path of the current path in the SRv6 TE Policy as the current path when the current path is abnormal, and returning to the step of sending an SRv6 TE Policy source path routing to other nodes on the current path included in the SRv6 TE Policy.

5. The method of claim 1, wherein the SRv6 TE Policy source path routing further comprises: an identifier ID of the SRv6 TE Policy;

the SRv6 TE Policy ID is used so that, when any node other than the headend on the current path, upon currently receiving the SRv6 TE Policy source path routing, finds that the SRv6 TE Policy ID has not been recorded, the node associates and records the first routing information carried by the currently received SRv6 TE Policy source path routing with the SRv6 TE Policy ID; if the SRv6 TE Policy ID has already been recorded, the node deletes routing information associated with the SRv6 TE Policy ID and a source path control table matching with the routing information, and associates and records the SRv6 TE Policy ID with the first routing information carried by the currently received SRv6 TE Policy source path routing.

6. A packet forwarding method, applied to a network node, and the method comprising:

if the network node serves as any node other than a headend of an SRv6 Traffic Engineering Policy TE Policy, then:

receiving an SRv6 TE Policy source path routing sent by a headend of the SRv6 TE Policy for a current path included in the SRv6 TE Policy; the SRv6 TE Policy source path routing carrying first routing information for forwarding packets on the current path;

recognizing whether the network node is on the current path, and if so, recording the first routing information carried by the SRv6 TE Policy source path routing;

receiving a source path control probe packet sent by the headend; the source path control probe packet carrying second routing information for forwarding packets on the current path; if recognizing that the second routing information carried by the source path control probe packet matches with the recorded first routing information, generating a source path control table that matches with the first routing information;

performing forwarding control on a service packet received by the network node based on the source path control table.

7. The method of claim 6, wherein the first routing information comprises at least: a Segment List; the Segment List containing segment identifiers SIDs of respective nodes other than the headend on the current path;

recognizing whether the network node is on the current path comprises: recognizing whether a segment identifier SID of the network node is in the Segment List; if so, determining that the network node is on the current path; otherwise, determining that the network node is not on the current path.

8. The method of claim 6, wherein the first routing information comprises: a routing identifier RouterID of the headend, a source IPv6 address used by the headend for SRv6 encapsulation, and a segment list Segment List; the Segment List containing segment identifier SIDs of respective nodes other than the headend on the current path;

the second routing information comprises: the routing identifier RouterID of the headend, the source IPv6 address used by the headend for SRv6 encapsulation, and the segment list Segment List of the current path, which comprises the segment identifiers SIDs of respective nodes other than the headend on the current path;

recognizing whether the second routing information carried by the source path control probe packet matches with the recorded first routing information comprises: if the RouterID carried by the source path control probe packet and the RouterID in the recorded first routing information meet a first preset matching requirement, the source IPv6 address carried by the source path control probe packet and the source IPv6 address in the recorded first routing information meet a second preset matching requirement, and the Segment List carried by the source path control probe packet and the Segment List in the recorded first routing information meet a third preset matching requirement, then determining that the second routing information carried by the source path control probe packet matches with the recorded first routing information.

9. The method of claim 6, wherein receiving a source path control probe packet sent by the headend for probing the current path comprises:

receiving a packet sent by the headend;

if a packet type carried by the packet is a first value which indicates a source path control probe packet, determining that the source path control probe packet sent by the headend has been received.

10. The method of claim 9, wherein the source path control probe packet encapsulates an IPv6 primary header, an SRv6 packet header SRH, and a RouterID header;

wherein the IPv6 primary header comprises at least a source address field, which carries the source IPv6 address used by the headend for SRv6 encapsulation;

the SRH comprises at least: a Routing Type field, a Next Header field, and a Segment List field; the Routing Type field carries a first value, which is used to indicate a source path control probe packet; the Next Header field carries a second value, which is used to indicate that a next packet header of the SRH carries the routing identifier RouterID of the headend; the Segment List field carries the Segment List of the current path, which comprises the segment identifiers SIDs of respective nodes other than the headend on the current path;

the RouterID header carries the routing identifier RouterID of the headend;

the second routing information comprises at least: the routing identifier RouterID of the headend carried in the RouterID header, the Segment List carried in the Segment List field, and the source IPv6 address carried in the source address field.

11. The method of claim 10, wherein the IPv6 primary header further comprises a destination address field; the SRH further comprises an SL field carrying SL which indicates a number of remaining segment identifiers SIDs in the Segment List, the remaining segment identifiers SIDs refer to segment identifiers SIDs corresponding to nodes that the source path control probe packet has not yet passed through;

the source path control table matched with the first routing information comprises at least: an interface where the source path control probe packet is received, the source IPv6 address carried in the source address field, the destination address carried in the destination address field, the Segment List carried by the source path control probe packet, and the SL;

performing forwarding control on a service packet received by the network node based on the source path control table comprises: checking whether an interface where the service packet is received, the source IPv6 address and the destination address encapsulated in the service packet, and the Segment List and the SL encapsulated in the service packet respectively match with the ingress interface, the source IPv6 address, the destination address, the Segment List, and the SL in the source path control table, if so, proceeding to forward the service packet; and if not, discarding the service packet.

12. The method of claim 11, wherein the method further comprises:

when the network node is not a last node on the current path, modifying the source path control probe packet and proceeding to forward the packet by: modifying the destination address field in the source path control probe packet to a node identifier of a next node following the network node on the current path, and updating the number in the SL field to obtain an updated number less than the number before updating by 1.

13. The method of claim 6, wherein the SRv6 TE Policy source path routing further comprises: an identifier ID of the SRv6 TE Policy;

the network node recording the first routing information carried by the SRv6 TE Policy source path routing comprises: recognizing whether there is routing information associated with the SRv6 TE Policy ID currently recorded; if not, associating and recording the currently received first routing information carried by the SRv6 TE Policy source path routing with the SRv6 TE Policy ID; if so, deleting the routing information associated with the SRv6 TE Policy ID and a source path control table that matches with the routing information, and associating and recording the SRv6 TE Policy ID with the first routing information carried by the current received SRv6 TE Policy source path routing.

14. A network node which serves as a headend of an SRv6 Traffic Engineering Policy TE Policy, the network node comprising:

a transmitter, a receiver, a memory and a processor connected with the transmitter, the receiver and the memory, wherein the processor is configured to the method of claim 1.

15. A network node which serves as any node other than a headend of an SRv6 Traffic Engineering Policy TE Policy, the network node comprising:

a transmitter, a receiver, a memory and a processor connected with the transmitter, the receiver and the memory, wherein the processor is configured to perform the method of claim 6.

* * * * *